(12) United States Patent
Johnson et al.

(10) Patent No.: US 9,573,116 B2
(45) Date of Patent: Feb. 21, 2017

(54) SYNTHESIS OF ZSM-58 CRYSTALS WITH IMPROVED DIFFUSIVITY FOR USE IN GAS SEPARATIONS

(71) Applicants: Ivy D. Johnson, Lawrenceville, NJ (US); Tilman W. Beutel, Neshanic Station, NJ (US); Peter I. Ravikovitch, Princeton, NJ (US); Harry W. Deckman, Clinton, NJ (US); Jack W. Johnson, Clinton, NJ (US); Jean W. Beeckman, Columbia, MD (US); Natalie A. Fassbender, Nazareth, PA (US); Nadya A Hrycenko, Clinton, NJ (US); Randolph J. Smiley, Hellertown, PA (US)

(72) Inventors: Ivy D. Johnson, Lawrenceville, NJ (US); Tilman W. Beutel, Neshanic Station, NJ (US); Peter I. Ravikovitch, Princeton, NJ (US); Harry W. Deckman, Clinton, NJ (US); Jack W. Johnson, Clinton, NJ (US); Jean W. Beeckman, Columbia, MD (US); Natalie A. Fassbender, Nazareth, PA (US); Nadya A Hrycenko, Clinton, NJ (US); Randolph J. Smiley, Hellertown, PA (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 243 days.

(21) Appl. No.: 14/573,177

(22) Filed: Dec. 17, 2014

(65) Prior Publication Data

US 2015/0182947 A1 Jul. 2, 2015

Related U.S. Application Data

(60) Provisional application No. 61/921,653, filed on Dec. 30, 2013.

(51) Int. Cl.
| | | |
|---|---|---|
| *C01B 39/02* | (2006.01) |
| *B01J 20/30* | (2006.01) |
| *C01B 39/04* | (2006.01) |
| *B01J 20/18* | (2006.01) |
| *B01J 20/282* | (2006.01) |
| *B01D 53/02* | (2006.01) |
| *C01B 37/02* | (2006.01) |
| *C01B 39/48* | (2006.01) |

(52) U.S. Cl.
CPC .......... *B01J 20/3078* (2013.01); *B01D 53/02* (2013.01); *B01J 20/18* (2013.01); *B01J 20/186* (2013.01); *B01J 20/282* (2013.01); *B01J 20/30* (2013.01); *B01J 20/3085* (2013.01); *C01B 37/02* (2013.01); *C01B 39/026* (2013.01); *C01B 39/04* (2013.01); *C01B 39/48* (2013.01); *B01D 2253/108* (2013.01); *B01D 2256/245* (2013.01); *B01D 2257/304* (2013.01); *B01D 2257/504* (2013.01); *B01J 2220/80* (2013.01); *Y02C 10/08* (2013.01); *Y02P 20/152* (2015.11)

(58) Field of Classification Search
CPC ....... C01B 37/02; C01B 39/026; C01B 39/04; C01B 39/48; B01D 53/02; B01D 2253/108; B01D 2256/245; B01D 2257/504; B01J 20/18; B01J 20/186; B01J 20/3078; B01J 20/3085; B01J 20/30
See application file for complete search history.

(56) References Cited

U.S. PATENT DOCUMENTS

| 4,698,217 A | 10/1987 | Valyocsik |
| 2014/0161717 A1 | 6/2014 | Johnson |
| 2016/0175815 A1 * | 6/2016 | Brody ................ B01J 20/28045 95/96 |

OTHER PUBLICATIONS

Wu et al, "The Effects of STeam Treatment, Impregnation with P, MG and Ion Exchange on Diffusion in HZSM-5 Zeolite", New Developments in Zeolite Science and Techhology, (Aug. 1986), pp. 481-486.*
Lutz et al, "Investigation of the mechanism of dealumination of zeolite y by steam:Tuned mesopore formation versus the Si/Al ratio", Proceedings: 14th International Zeolite Conference, (Apr. 2004), pp. 1411-1417.*
Ernst et al., "Hydrothermalsynthese des Zeoliths ZSM-58 and templatfreie Synthese von Zeolith ZSM-5", Chemie Ingenieur Technik, Jul. 1, 1991, pp. 748-750, vol, 63, No. 7, VCH Verlagsgesellschaft mbH, D-6940 Weinheim.

(Continued)

*Primary Examiner* — David M Brunsman
(74) *Attorney, Agent, or Firm* — David M. Weisberg (57) ABSTRACT

Methods are provided for synthesizing ZSM-58 crystals with an improved morphology and/or an improved size distribution. By controlling the conditions during synthesis of the ZSM-58 crystals, crystals of a useful size with a narrow size distribution can be generated. Steaming the H-form DDR framework type crystals at a temperature from 426±° C. to 1100±° C. for a time period from about 30 minutes to about 48 hours can attain one or more of the following properties: a CH4 diffusivity of no more than 95% of the CH4 diffusivity of the unsteamed H-form DDR framework type crystals; an N2 BET surface area from 85% to 110% of the surface area of unsteamed H-form DDR framework type crystals; and an equilibrium CO2 sorption capacity from 80% to 105% of the equilibrium CO2 sorption capacity of unsteamed H-form DDR framework type crystals.

19 Claims, 2 Drawing Sheets

(56) References Cited

OTHER PUBLICATIONS

Maier et al., "Steaming of Zeolite BEA and Its Effect on Acidity: A Comparative NMR and IR Spectroscopic Study", Journal of Physical Chemistry C, Apr. 28, 2011, pp. 8005-8013, vol. 115, No. 16, ACS Publications.
Vidoni et al., "Diffusion of methane in DD3R zeolite", Microporous and Mesoporous Materials, Apr. 5, 2012, pp. 57-65, vol. 159, Elsevier Science Publishing, New York.
International Search Report and Written Opinion from PCT/US2014/070786 dated Apr. 2, 2015.

* cited by examiner

Figure 1. Schematic diagram of a ZLC apparatus.

Figure 2. MS signal of methane during ZLC experiment for two consecutive runs.

Figure 3. Normalized and logarithmized ZLC curve, ln(c(t)/c(0)) vs. time.

SYNTHESIS OF ZSM-58 CRYSTALS WITH IMPROVED DIFFUSIVITY FOR USE IN GAS SEPARATIONS

CROSS-REFERENCE TO RELATED APPLICATIONS

This application claims the benefit of provisional U.S. Ser. No. 61/921,653, filed on Dec. 31, 2013, the entire contents of which are hereby incorporated by reference herein.

FIELD OF THE INVENTION

Treated zeolites with improved gas diffusivities are described, along with methods for preparing the same.

BACKGROUND OF THE INVENTION

Zeolite crystal structures have found a wide range of applications within refinery processes and other processes for manipulating petroleum streams. Some zeolite applications are catalytic in nature, while other applications focus on the ability of zeolites to selectively adsorb molecules within a gas stream.

One example of a zeolite that is potentially suitable for selective adsorption of molecules is ZSM-58. ZSM-58 is a DDR-type zeolite with an 8-member ring structure. U.S. Pat. No. 4,698,217 describes a method for synthesizing ZSM-58 using a methyltropinium salt as the directing agent.

ZSM-58 is a relatively underdeveloped crystal, primarily due to the relatively high cost of the structure directing agent, a methyltropinium salt such as the iodide, and the low solids (e.g., low throughput) of the synthesis formulation. Historical work on this zeolite crystal has generally evaluated its ability to separate gas molecules based on the steric adsorption (i.e., molecular sieve effect) at equilibrium rate and capacity. The rate of adsorption of zeolites in general, and DDR/ZSM-58 in particular, was primarily dependent upon pore opening size. That is, the pore opening acted as a sieve to control entry into the zeolite and the adsorbent capacity of the zeolite.

However, when far from equilibrium rates (as in commercial-sized pressure swing adsorption units, or PSAs), kinetic effects can and often do lead to differences in component adsorption/separation, usually not towards better adsorption/separation but typically toward less effective adsorption/separation. In the past, ZSM-58 crystals have been plagued by slight defects (imperfections) that have the undesirable effect of allowing faster than desired transport through the zeolite crystal. Being able to remediate these defects and slow down the diffusion with a commercially viable process can be of paramount importance.

For $CH_4/CO_2$ separations, the diffusivity of $CH_4$ typically determines the efficacy of the PSA unit being developed for commercialization. The efficiency of the separation is greatly dependent upon the diffusivity properties of the crystal. The slower the diffusion of $CH_4$, the better the separation in the PSA.

Zero Length Chromatography (ZLC) can be used to measure diffusivities of gaseous components, particularly in difficult-to-engineer systems such as ZSM-58. The instant invention uses ZLC to track methane diffusivities, as synthesis and/or treatment parameters vary, allowing for quick validation of higher-desirability candidates for commercially viable processes and/or for further scientific research.

SUMMARY OF THE INVENTION

In one aspect, a method is provided for synthesizing a DDR framework type zeolite, comprising: forming a reaction mixture capable of forming crystalline DDR framework type material, the mixture comprising water, a silicon oxide, an alkali or alkaline earth hydroxide, and a methyltropinium salt structure directing agent, the mixture having a ratio of silicon oxide to hydroxide of about 0.01 to about 1.0, a ratio of silicon oxide to alkali and alkaline earth metal of about 0.01 to about 2.0, a ratio of silicon oxide to structure directing agent of about 0.01 to about 2.0, and at least about 0.05 wt % of seeds relative to the weight of the mixture; recovering DDR framework type crystals from the reaction mixture; converting the recovered DDR framework type crystals to their H-form, wherein the H-form DDR framework type crystals have an $N_2$ BET surface area and a methane diffusivity; steaming the H-form DDR framework type crystals at a temperature from 426° C. to 1100° C. for a time period from about 1 hour to about 48 hours, so as to attain one or more of the following properties: a $CH_4$ diffusivity of no more than 95% of the $CH_4$ diffusivity of otherwise identical but unsteamed H-form DDR framework type crystals; an $N_2$ BET surface area from 85% to 110% of the $N_2$ BET surface area of otherwise identical but unsteamed H-form DDR framework type crystals; following a pre-treatment at about 100° C., an equilibrium $CO_2$ sorption capacity from 80% to 105% of the equilibrium $CO_2$ sorption capacity of otherwise identical pre-treated but unsteamed H-form DDR framework type crystals; and following a pre-treatment at about 400° C., an equilibrium $CO_2$ sorption capacity from 80% to 105% of the equilibrium $CO_2$ sorption capacity of otherwise identical pre-treated but unsteamed H-form DDR framework type crystals.

DETAILED DESCRIPTION OF THE EMBODIMENTS

Overview

ZSM-58 is an 8-membered ring crystal with a DDR crystal structure, and the methods herein relating to formation of ZSM-58 crystalline material is believed to be easily translatable to the formation of other DDR framework type crystalline materials. Potential uses for DDR/ZSM-58 include uses in separation of gases. For example, due to the pore size of DDR/ZSM-58, the crystals can be suitable for separating molecules such as $N_2$ and $CO_2$ from low molecular weight hydrocarbons such as $CH_4$. ZSM-58 is viewed conventionally as being an expensive crystal structure to form. This may be due in part to the high cost of the typical structure directing agent, methyltropinium salts like the iodide form, as well as the high $H_2O:SiO_2$ ratio and/or low throughput of conventional synthesis techniques.

In addition to being a relatively expensive crystal to synthesize, conventional ZSM-58 synthesis techniques can tend to produce crystals with poor size uniformity (relatively broad size distribution). As noted above, one application for ZSM-58 can be in gas phase separation. For zeolite crystals used in a gas phase separation, it can be beneficial to produce crystals with a relatively narrow distribution of sizes. Maintaining a relatively narrow size distribution can assist with having relatively uniform and/or relatively easily predictable adsorption (or other zeolite activity/reaction) across the crystals within a device, such as a separation device. Additionally, it can also be beneficial for individual crystals to have relatively isotropic reaction and/or adsorption activity. In other words, it can be desirable for an individual crystal to exhibit similar activity and/or adsorption properties, independent of how the crystal is aligned relative to a potential reactant or adsorbent. This uniformity of behavior for a single crystal can often be impacted by defects in the crystal.

In various aspects, methods are provided for synthesizing ZSM-58 crystals with an improved (reduced) level of crystal defects, as reflected by improved (lower) diffusivities for gaseous adsorbents, such as methane. By controlling the conditions during synthesis of the ZSM-58 crystals, crystals of a useful size with a narrow size distribution can be generated. Additionally, by controlling the ratio of water content to silicon oxide ($SiO_2$) content in the synthesis mixture, ZSM-58 crystals can be formed with an improved morphology. The improved morphology can result in ZSM-58 crystals with a more uniform size across the various dimensions of the crystal, which can thus allow for more uniform diffusion among the distribution of crystals. This can be in contrast to conventionally synthesized crystals, where the size of the crystal can vary significantly along different axes of the crystals. This change in morphology can be achieved without changing the size range of the crystals. In other words, crystals of comparable size with two different morphologies can be created by selecting appropriate synthesis conditions. In some aspects, the methods for synthesizing ZSM-58 crystals can include methods for using methyltropinium chloride or methyltropinium hydroxide as a structure directing agent, in contrast to the methyltropinium iodide that has been traditionally used. Furthermore, by introducing post-synthesis treatment of the ZSM-58 crystals with larger average sizes, more uniform size distribution, and improved morphologies, any crystalline defects that may have been introduced or locked in during synthesis can be reorganized, removed, and/or minimized.

Crystal Morphology and Synthesis Throughput

A typical recipe for the synthesis mixture for a zeolite can include relatively broad ranges for the allowed ratios of reactants. For example, the initial description of ZSM-58 synthesis in U.S. Pat. No. 4,698,217 described $SiO_2:Al_2O_3$ ratios of 50-1000 and $H_2O:SiO_2$ ratios of 5-200.

Although U.S. Pat. No. 4,698,217 generally discloses $H_2O:SiO_2$ ratios of 5-200, it is noted that the examples provided therein exhibited an $H_2O:SiO_2$ ratio of only 40. Water itself may not generally be viewed as having a direct impact on the types of crystals formed during synthesis. Instead, the amount of water added to a zeolite synthesis mixture can be arbitrary or can be selected based on a variety of factors. One set of factors can be related to providing enough liquid in the synthesis mixture to solubilize the raw materials and to also achieve a relatively homogeneous mixture. If the synthesis mixture is not sufficiently homogenized, crystal formation may occur at a lower rate and/or crystals other than the desired type may form. Adding more water to a synthesis mixture can help to insure that all of the components can be sufficiently soluble (dissolved) in the water, as well as to assist in achieving a sufficiently homogenous mixture when mixed. However, water can also act as a diluent. Thus, another consideration or factor can be related to the impact of water on process throughput. Once enough water is present to allow formation of a homogenous mixture, any additional water can tend to unnecessarily slow the synthesis process for the desired crystals. This can be due in part to the need to remove the water once the desired crystals are formed. From a practical standpoint, ratios of $H_2O:SiO_2$ of about 40-50 were believed to provide enough water for forming a homogenous mixture without having an undue excess of water.

Reducing the $H_2O:SiO_2$ molar ratio, in combination with including seed crystals in the synthesis mixture, can have an impact on crystal formation for ZSM-58. Instead of just serving as a medium for mixing the reagents, it has been discovered that using a $H_2O:SiO_2$ ratio from about 12 to about 25 (e.g., from about 12 to about 20) in the presence of seed crystals can result in formation of ZSM-58 crystals with a distinct and desirable morphology. Conventional synthesis mixtures for forming ZSM-58 led to formation of crystals that corresponded to a discotic morphology with hexagonal faceting. The hexagonal disc morphology can generally have primarily hexagonal faces. The top and bottom hexagonal faces can generally correspond to larger hexagonal faces, with a smaller depth dimension (roughly) perpendicular to the top and bottom faces. By contrast, synthesis mixtures with a $H_2O:SiO_2$ ratio from about 12 to about 20 and including seed crystals can result in formation of crystals with a rounded or (approaching) circular disc face/shape. The depth dimension for the rounded discs can also be smaller than the lateral dimensions of the rounded faces of the disc.

Differences in the conventional hexagonal disc morphology and the rounded disc morphology can be seen in SEM micrographs, for example. Whether hexagonal or circular/rounded disc morphology, x-ray diffraction (XRD) techniques have been used to verify that crystals with the respective morphology all appear to have the common ZSM-58 crystal structure.

Structure Directing Agents—Methyltropinium Salts

For many types of zeolites, formation of a desired zeolite can be highly sensitive to the nature of the structure directing agent. Even within a family of related structure directing agents, such as a series of organic halides, changing from one halide to another can lead to significant modifications in the resulting crystals formed from a synthesis mixture. In various embodiments, it has been discovered that methyltropinium chloride can be used as a structure directing agent in place of methyltropinium iodide while producing similar crystals.

Methyltropinium iodide has been used as the structure directing agent for previously published working examples of ZSM-58 synthesis. However, methyltropinium iodide can be a relatively expensive reagent. Additionally, iodide salts can generally be less preferred for industrial synthesis procedures for microporous materials, perhaps due to certain hazards presented by some iodide salts, such as certain health risks posed by iodide salt precursors. Methyltropinium chloride can offer a lower cost structure directing agent option, which can potentially allow for reduced ZSM-58 production costs. It has been determined that methyltropinium chloride can be used in place of methyltropinium iodide, while generating similar types of ZSM-58 crystals. In addition to methyltropinium chloride, methyltropinium hydroxide can additionally or alternately be used as a lower cost alternative to methyltropinium iodide.

Synthesis of DDR-Type Zeolites

ZSM-58 can be prepared from a reaction mixture containing a source of an alkali or alkaline earth metal (M) cation, such as sodium; optionally a source of an oxide of aluminum; a source of an oxide of silicon; and a source of an organic cation (R) of a methyltropinium salt, such as a halide, hydroxide, or sulfate; and water. For example, a reaction mixture for forming ZSM-58 can include sodium hydroxide (NaOH), optionally sodium aluminate (NaAlO$_3$), a silicon oxide (typically SiO$_2$), methyltropinium iodide (potentially referred to as MTI), and water (H$_2$O). Suitable ratios for the various components in the reaction mixture can include those listed in Table A below.

TABLE A

| Reactants | Suitable | Preferred | U.S. Pat. No. 4,698,217 (broad) | U.S. Pat. No. 4,698,217 (narrow) |
|---|---|---|---|---|
| SiO$_2$:Al$_2$O$_3$ | 50 or higher* | 50-1000 (or higher)* | 50-1000 | 70-500 |
| H$_2$O:SiO$_2$ | 10-25 | 12-20 | 5-200 | 10-100 |
| OH$^-$:SiO$_2$ | 0-2.0 | 0-1.0 | 0-2.0 | 0.1-1.0 |
| M:SiO$_2$ | 0.01-3.0 | 0.01-1.0 | 0.01-3.0 | 0.1-1.0 |
| R:SiO$_2$ | 0.01-2.0 | 0.01-0.5 | 0.01-2.0 | 0.1-0.5 |

*including mixtures with no intentionally added source of alumina.

As noted in Table A, intentional addition of a source of alumina is not required. For synthesis mixtures with little or no intentionally added alumina, the ratio of SiO$_2$:Al$_2$O$_3$ can usually be determined by the aluminum impurities present in the reagents. Though aluminum-containing impurities may be present in trace/contaminant amounts in components of the mixture (e.g., in the source of silica), such components are not considered sources of alumina herein.

In several preferable embodiments, the synthesis mixture for synthesis of ZSM-58 crystals can further include seeds to facilitate crystal formation. One option can be to introduce seed crystals corresponding to the desired crystal structure. Any convenient type of crystals can be used, such as dried crystals, wet crystals, or a wet cake of crystals. The seed crystals need not necessarily be processed using ion exchange or other finishing processes that would normally be applied to crystals for use in a production environment.

Crystallization of the ZSM-58 can be carried out at either static or stirred conditions in a suitable reactor vessel (e.g., in a polypropylene jar or a Teflon™-lined or stainless steel autoclave). The total useful range of temperatures for crystallization can extend from about 80° C. to about 225° C. (e.g., from about 120° C. to about 175° C.). When a synthesis mixture is initially formed, the temperature of the synthesis mixture can be increased to the desired synthesis temperature in any convenient manner. For example, the temperature of the synthesis mixture can be increased by at least 10° C. per hour, for example at least 25° C. per hour, at least 40° C. per hour, or at least 75° C. per hour, until the desired synthesis temperature is achieved. The temperature can be maintained for a time sufficient for crystallization to occur at the temperature used, e.g., which can range from about 24 hours to about 60 days. Thereafter, the crystals can be separated from the liquid and recovered. For example, after forming the ZSM-58 crystals, the product can be filtered, washed with deionized (DI) water, and dried at a suitable temperature for removing water, such as from about 100° C. to about 140° C.

The reaction mixture can be prepared utilizing materials which supply the appropriate oxides. Such materials may include, but are not necessarily limited to, sodium silicate, silica hydrosol, silica gel, silicic acid, precipitated silica-alumina sols, sodium hydroxide, optionally sodium aluminate, optionally alumina, and the methyltropinium salt directing agent. Methyltropinium salts, such as methyltropinium iodide, chloride, and/or hydroxide, may be commercially available for purchase in sufficient purity for use as reagents. Alternatively, the methyltropinium salt may be synthesized by selective methylation of 3-tropanol at the bridgehead nitrogen. This salt can have the following formula:

wherein X is an anion, such as, for example, a halide (e.g., iodide, chloride, bromide, or the like, or a combination thereof), nitrate, hydroxide, sulfate, bisulfate, perchlorate, or the like, or a combination thereof.

It should be realized that the reaction mixture components can be supplied by more than one source. The reaction mixture can be prepared either batchwise or continuously. Crystal size and crystallization time of the new crystalline material can vary with the nature of the reaction mixture employed and the crystallization conditions. Optionally, synthesis of the ZSM-58 crystals can be facilitated by the presence of about 0.05 wt % to about 5.0 wt % (e.g., from about 0.10 wt % to about 5.0 wt % or from about 1.0 wt % to about 5.0 wt %) seed crystals of crystalline product.

The ZSM-58 crystals synthesized according to various embodiments of the invention can have a purity of at least about 85 wt %, e.g., at least about 90 wt %, at least about 95 wt %, or at least about 98 wt %. The purity refers to the wt % of crystals that have a ZSM-58 type morphology versus other types of crystalline morphologies present in a crystalline product.

Typically, zeolite crystals can be formed by first creating a synthesis mixture of components, such as the synthesis mixtures described herein. This mixture may or may not be aged at ambient conditions for anywhere from about 0.5 to about 48 hours prior to crystallization. After heating the synthesis mixture at an effective temperature for an effective period of time, the crystals formed in the synthesis mixture can be separated from the aqueous environment of the mixture, such as by filtration. The crystals can then be typically dried and calcined prior to use. For example, the crystals can be calcined at a temperature from about 350° C. to about 925° C. for about 1 minute to about 1 hour, e.g., about 1 minute to about 20 minutes. To reach the calcination temperature, the temperature of the oven or other device for heating the crystals can be ramped at about 50° C. per hour, about 100° C. per hour, or at another convenient increment. The crystals can optionally be held at incremental temperatures (e.g., every hour, every other hour, etc.) for a period of time prior to continuing to increase the temperature to the desired final calcination temperature. The incremental heating can allow water vapor to exit the crystal structure while reducing/minimizing damage to, and/or morphology changes in, the crystals.

Additionally or alternately, after crystal formation, the crystals can be treated using one or more of several procedures. One procedure can include filtering, washing with deionized (DI) water, and drying the crystals at a suitable temperature for removing water, such as from about 100° C. to about 140° C.

In some forms, DDR-type crystals can contain organic material(s) that was (were) used as the template/structure directing agent(s). Prior to use as a catalyst or adsorbent, such material can be treated to remove all or part of the organic constituent. This can be conveniently effected by heating such organic-containing crystals at a temperature from about 250° C. to about 550° C., e.g., for from 1 hour to about 48 hours.

The crystalline materials of this invention, when employed either as an adsorbent or as a catalyst, can also be at least partially dehydrated. This can be done by heating to a temperature in the range from 200° C. to about 370° C. in an oxidative or inert atmosphere (such as air or nitrogen, respectively) and at atmospheric, subatmospheric, or superatmospheric pressures, e.g., for between about 30 minutes and about 48 hours. Dehydration can also be performed at room temperature (~20-25° C.) merely by placing the DDR-type crystals in a vacuum, but a longer time may be required to obtain a sufficient amount of dehydration.

Optionally, the crystals can also be calcined at a temperature of about 350° C. to about 925° C. for 1 minute to 24 hours, e.g., from 1 minute to 20 minutes, from 30 minutes to 8 hours, or from 1 hour to 24 hours. To reach the calcination temperature, the temperature of the oven or other device for heating the crystals can be raised in increments of 50° C., 100° C., or another convenient increment. The crystals can be held at the incremental temperatures for a period of time prior to continuing to increase the temperature to the desired final calcination temperature. The incremental heating can allow water vapor to exit the crystal structure while reducing or minimizing damage and/or morphology changes in the crystals.

To the extent desired, the original cations of the as-synthesized material, such as sodium cations, can be replaced in accordance with techniques well known in the art, at least in part, by ion exchange with other cations. Preferred replacing cations include metal ions, hydrogen ions, hydrogen precursor, e.g., ammonium ions and mixtures thereof.

In various embodiments, the above procedures can be modified and/or replaced in order to perform an ion exchange procedure in order to reduce the content of sodium or other alkali metal impurities. After heating a synthesis mixture for a sufficient amount of time to form crystals, the crystals in a synthesis mixture can be separated from the aqueous environment of the mixture, such as by filtration. The separated crystals can then be exposed to a water wash. For example, the filtered crystals can be rinsed with water at a temperature between about 20° C. and about 70° C. The volume of water used for the water wash can typically be at least the volume of the corresponding crystals. Optionally, the crystals can also be exposed to an organic wash, such as using acetone, before or after the water wash. The organic wash can be performed at a convenient temperature, such as below about 40° C., with a volume of organic solvent that, like the water, can be at least the volume of the crystals. After the water wash and the optional organic wash, the washed crystals can be filtered to separate them from the wash fluids. After filtration and drying, an initial calcination can be performed on the crystals, such as a calcination as described above. The heating profile for the calcinations can optionally include pauses at incremental temperature values to allow for more thorough drying of the filtered crystals. The crystals can then be exposed to an acidic aqueous environment, such as a 1M solution of acetic acid or hydrochloric acid. Other suitable acidic solutions can include acidic solutions compatible with the zeolite crystals (i.e., that do not dissolve and/or decrystallize the zeolite), such as other strong acids and organic acids with a pKa value of 6.0 or less, e.g., 5.0 or less. This can allow the alkali metal impurities in the DDR-type zeolites to be exchanged with hydrogen ions from the acidic solution. After the exchange, the crystals can be dried/calcined for a second time prior to use. The acidic solution can have any convenient concentration, so long as an excess of ions are available in solution for exchange with the alkali metal impurities in the crystals. For convenience, the acidic solution can have a concentration of at least about 0.1 M, e.g., at least about 1.0 M.

In preferred embodiments, after synthesis and typically also after calcination and/or dehydration, the zeolite crystals can be treated by steaming, or exposure to a moisture-containing atmosphere for a sufficient time at an elevated temperature. Though the sufficient time can be dependent upon the exact elevated temperature, the sufficient time can be at least about 30 minutes, e.g., at least about 1 hour, at least about 2 hours, at least about 3 hours, at least about 4 hours, at least about 6 hours, at least about 8 hours, at least about 10 hours, at least about 12 hours, at least about 15 hours, at least about 18 hours, at least about 21 hours, at least about 24 hours, at least about 30 hours, at least about 36 hours, at least about 42 hours, or at least about 48 hours; additionally or alternately, the sufficient time can be up to about 168 hours, e.g., up to about 144 hours, up to about 120 days, up to about 96 hours, up to about 84 hours, up to about 72 hours, up to about 60 hours, up to about 48 hours, up to about 42 hours, up to about 36 hours, up to about 30 hours, up to about 24 hours, up to about 21 hours, up to about 18 hours, up to about 15 hours, or up to about 12 hours. In such embodiments, the elevated temperature can be e.g., at least about 900° F. (about 482° C.), at least about 1004° F. (about 540° C.), at least about 1112° F. (about 600° C.), at least about 1292° F. (about 700° C.), at least about 1427° F. (about 775° C.), at least about 1562° F. (about 850° C.), at least about 1652° F. (about 900° C.), at least about 1742° F. (about 950° C.), at least about 1832° F. (about 1000° C.), at least about 1922° F. (about 1050° C.), or at least about 2012° F. (about 1100° C.); additionally or alternatively, the elevated temperature can be up to about 2372° F. (about 1300° C.), e.g., up to about 2192° F. (about 1200° C.), up to about 2102° F. (about 1150° C.), up to about 2012° F. (about 1100° C.), up to 1922° F. (about 1050° C.), up to about 1832° F. (about 1000° C.), up to about 1742° F. (about 950° C.), up to about 1652° F. (about 900° C.), or up to about 1562° F. (about 850° C.).

In one exemplary embodiment, the steaming can be conducted in a rotary calciner, e.g., in order to selectively reduce the methane diffusivity of the zeolite crystals, particularly in comparison to minimal, if any, impact on the carbon dioxide sorption capacity of the zeolite crystals. In the rotary calciner, the steam can constitute from about 10 vol % to about 100 vol % of the atmosphere, e.g., from about 20 vol % to about 80 vol %, from about 25 vol % to about 75 vol %, from about 30 vol % to about 70 vol %, from about 35 vol % to about 65 vol %, or from about 40 vol % to about 60 vol %. Additionally or alternately in the rotary calciner, the calcination can be undertaken at the desired temperature (and/or with the desired temperature range) for an appropriate duration, e.g., from about 1 minute to about 10 hours, from about 10 minutes to about 4 hours, from about 15 minutes to about 2 hours, from about 25 minutes to about 1 hour, or from about 30 minutes to about 45 minutes.

In most embodiments, the steamed crystal(s) can advantageously have a relatively low level of framework aluminum (such as exhibiting a $SiO_2:Al_2O_3$ ratio of at least 3000, e.g., at least about 4000, at least about 5000, at least about 7500, or at least about 10000; additionally or alternatively, the steamed crystal(s) can originate from synthesis mixtures containing no intentionally added sources of aluminum and can have no post-treatments designed to intentionally add aluminum into the zeolite internal pore surfaces, onto the external surfaces of the zeolite, or into the zeolite framework structure) and/or can advantageously be in the H-form (i.e., the acid form or the active form) or at least in a form where there are substantially no (e.g., less than 1000 wppm, less than 750 wppm, less than 500 wppm, less than 400 wppm, less than 300 wppm, less than 200 wppm, or less than 100 wppm) alkali or alkaline earth (e.g., lithium, sodium, potassium, magnesium, calcium, or combinations thereof) ions present in the pores of the zeolite.

However, in embodiments where the zeolite crystal(s) to be steamed exhibit(s) more than a relatively low level of framework aluminum (such as exhibiting a $SiO_2:Al_2O_3$ ratio of less than 3000, e.g., less than about 2500, less than about 2000, less than about 1500, less than about 1000, less than about 750, less than about 500, less than about 250, or less than about 150), the sufficient time at the elevated temperatures in the steaming conditions may need to be longer and/or the temperatures hotter, due to the steaming potentially creating more defects, e.g., by rendering the framework aluminum atoms mobile and creating more fissures/defects than the heat/steam could otherwise anneal.

Additionally or alternatively, the steamed crystal(s) can advantageously have one or more of the following properties: a $CH_4$ diffusivity of no more than 95% (e.g., no more than 90%, no more than 85%, no more than 80%, no more than 75%, no more than 70%, no more than 65%, no more than 60%, no more than 55%, no more than 50%, no more than 45%, no more than 40%, no more than 35%, or no more than 30%) of the $CH_4$ diffusivity of otherwise identical but unsteamed crystal(s); an $N_2$ BET surface area of at least 85% (e.g., at least 90%, at least 92%, at least 94%, at least 95%, at least 96%, at least 97%, at least 98%, or at least 99%) of the $N_2$ BET surface area of otherwise identical but unsteamed crystal(s), and optionally also an $N_2$ BET surface area of up to 110% (e.g., up to 108%, up to 106%, up to 105%, up to 104%, up to 103%, up to 102%, up to 101%, or up to 100%) of the $N_2$ BET surface area of otherwise identical but unsteamed crystal(s); following a pre-treatment at about 100° C., an equilibrium $CO_2$ sorption capacity of at least 80% (e.g., at least 83%, at least 86%, at least 88%, at least 90%, at least 92%, at least 94%, or at least 95%) of the equilibrium $CO_2$ sorption capacity of otherwise identical pre-treated but unsteamed crystal(s), and optionally also an equilibrium $CO_2$ sorption capacity of up to 105% (e.g., up to 104%, up to 103%, up to 102%, up to 101%, up to 100%, up to 99%, up to 98%, up to 97%, up to 96%, up to 95%, up to 94%, up to 93%, up to 92%, up to 91%, or up to 90%) of the equilibrium $CO_2$ sorption capacity of otherwise identical pre-treated but unsteamed crystal(s); and, following a pre-treatment at about 400° C., an equilibrium $CO_2$ sorption capacity of at least 80% (e.g., at least 83%, at least 86%, at least 88%, at least 90%, at least 92%, at least 94%, or at least 95%) of the equilibrium $CO_2$ sorption capacity of otherwise identical pre-treated but unsteamed crystal(s), and optionally also an equilibrium $CO_2$ sorption capacity of up to 105% (e.g., up to 104%, up to 103%, up to 102%, up to 101%, up to 100%, up to 99%, up to 98%, up to 97%, up to 96%, up to 95%, up to 94%, up to 93%, up to 92%, up to 91%, or up to 90%) of the equilibrium $CO_2$ sorption capacity of otherwise identical pre-treated but unsteamed crystal(s).

Zero-Length-Chromatography Technique:

The diffusivity of methane in the zeolite crystals used in the invention was measured by zero-length chromatography. This technique was used to measure the rate of desorption of a gaseous sorbate from a solid sorbent in the presence of a concentration gradient. In the present invention, methane was used as sorbate and DDR framework-type zeolites as the sorbent/sample. The ZLC process includes two steps that are carried out at the same temperature and total pressure: i) an adsorption step, also called loading step, during which a gaseous sorbent is adsorbed into the micropores of the zeolite (the adsorption step should be long enough to achieve equilibration between the gaseous and the adsorbed sorbate phase); and ii) a desorption step, also called purge step, during which the sorbate is desorbed from the zeolite in an inert gas flow. The sorbate concentration in the effluent gas can be monitored by a gas analyzer, and the rate of diffusion of the sorbate can be calculated from the concentration profile of the sorbate as a function of time during the purge step. The flow rate of the purge gas should be high enough to allow rapid removal of sorbate gas from the surface of the sorbent as well as from the void volume between the sorbent crystals. As a result of this efficient sample purge, the diffusion of sorbate throughout the sorbent can occur in the presence of a concentration gradient, resulting in the measurement of transport diffusivities. Consequently, the diffusivities determined from the sorbate concentration profile measured in this experiment can be determined by the mass transfer rate of sorbate inside the zeolitic micropores. One key aspect in ZLC measurements can be the use of relatively small sample amounts, so as to minimize heat and external mass transfer effects.

Figure 1:
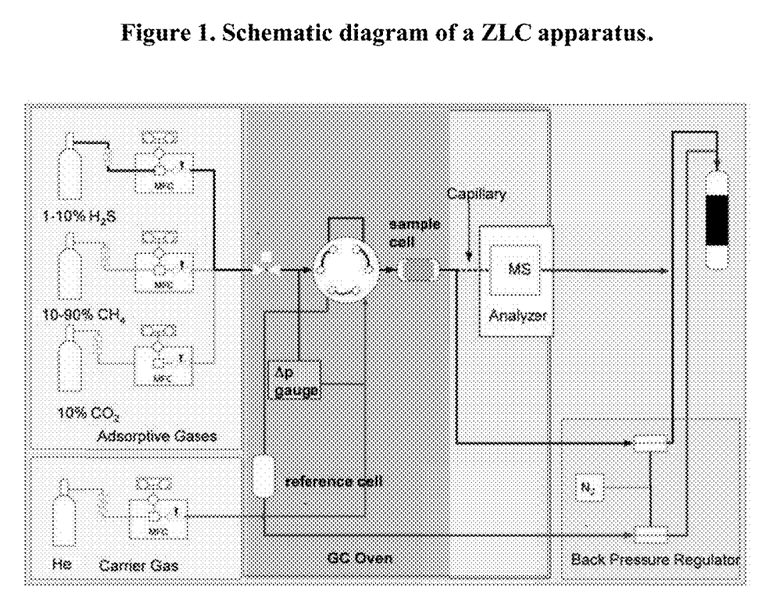
FIG. 1 shows a schematic drawing of a ZLC apparatus depicting flow paths of the sorbate (solid blue line) and of the purge gas (solid red line) during the loading phase of the sorbate.

Apparatus:

FIG. 1 shows a schematic drawing of the ZLC apparatus depicting the flow paths of the sorbate (solid blue line), ~10% methane in helium, and of the purge gas (solid red line), ~100% helium, during the loading phase of the sorbate. The flow rates of the sorbate and purge gas were controlled by mass flow controllers (MFC). The two gas streams were connected to the two inlet ports of a switching valve. A sample holder, also called sample cell, containing the sorbate was located downstream of the switching valve, so as to enable the sample to be exposed to sorbate gas during the loading phase of the sorbate (as indicated by solid blue line). Another equivalent sample holder, also called reference cell, was filled with non-porous quartz and positioned in the purge line downstream of the switching valve. The purpose of the reference cell was to help establish equal back pressure in the sample and purge line.

The effluent from the sample cell and the outlet of the helium purge line from the switching valve were each connected to back pressure regulators (BPR). The BPRs were set so as to establish an equal pressure in the sorbate and purge lines. The pressure in the sample line, as well as the pressure difference between the sample and the purge line, were monitored by pressure gauges. A split stream was derived from the effluent of the sample cell and directed to a mass spectrometer (MS) for analysis of the sorbate gas concentration. Both sorbate and purge gas streams were sent to a scrubber for removal of sour gases (e.g., $CO_2$, $H_2S$, and the like, and combinations thereof). The switching valve and the sample cell were housed in a heated section of a gas chromatograph (GC), in order to conduct experiments at elevated temperatures. After the adsorption and equilibration step, the flows of gases exiting the switching valve were interchanged, by rotating the switching valve from position 1 (adsorption step) to position 2 (desorption step). In position 2, helium purge gas was set to flow over the sample cell, removing sorbate gas from the sorbent.

Control of Crystal Size Distribution

In addition to facilitating interesting crystal morphologies, the use of seed crystals can also facilitate synthesis of ZSM-58 crystals with improved uniformity of crystal size. The size distribution for crystals in a sample can be determined by light scattering, such as by using a Horiba™ light scattering detector for determining a size distribution of crystals as a function of volume. In the size distributions described herein, the size distribution can be expressed as a series of bins of ~1 μm size.

An improved size distribution for the synthesis methods described herein can be defined based on several factors. First, a plot of the size distribution relative to volume can preferably be mono-modal, so as to exhibit a single peak (e.g., not be bi-modal or otherwise multi-modal). For the discussion herein, the size distribution is considered bi-modal if two separate peaks in a size distribution plot have a peak volume percentage greater than 2.5% and thus considered mono-modal if only one peak is present whose volume percentage is greater than 2.5%. Another preferable feature can be that the peak height for the primary (or only) peak in the volume distribution can correspond to at least 10% of the crystal volume. In other words, the 1 μm bin corresponding to the peak in the volume distribution can include crystals corresponding to at least 10% of the crystal volume. A third preferable feature can be that less than 10% of the total crystal volume can correspond to crystals with a characteristic size of less than 5 μm.

Still another potential feature can involve the width of the primary peak. In Horiba™ plots, the x-axis can correspond to the log of the crystal size, which plot aspect can result in the appearance of a roughly Gaussian shape for the primary peak. One way of characterizing a Gaussian type shape can be based on the full width of the peak at half of the maximum height (full-width half-maximum). Although such a full width at half maximum measurement can often correspond to a log scale width, a width expressed on a linear scale can be derived based on the height values on either side of the peak. In some embodiments, the difference between the crystal sizes at full-width half-maximum can be about the maximum height of the peak or less. For example, a hypothetical Horiba™ plot of crystal size could have a peak at a crystal size of 17 μm. At half of the peak height, the crystal size values can be 12 μm and 26 μm, respectively, which would result in a difference in the crystal sizes at half-maximum of 14 μm, which is less than the crystal size at the peak. It is noted that this definition for a "narrow" crystal size distribution scales up as the size value for the most common crystal size increases.

Other Embodiments

Additionally or alternately, the present invention can include one or more of the following embodiments.

Embodiment 1

A method for synthesizing a DDR framework type zeolite, comprising: forming a reaction mixture capable of forming crystalline DDR framework type material, the mixture comprising water, a silicon oxide, an alkali or alkaline earth hydroxide, and a methyltropinium salt structure directing agent, the mixture having a ratio of silicon oxide to hydroxide of about 0.01 to about 1.0, a ratio of silicon oxide to alkali and alkaline earth metal of about 0.01 to about 2.0, a ratio of silicon oxide to structure directing agent of about 0.01 to about 2.0, and at least about 0.05 wt % of seeds relative to the weight of the mixture; recovering DDR framework type crystals from the reaction mixture and optionally dehydrating and/or calcining them; converting the recovered (and optionally dehydrated and/or calcined) DDR framework type crystals to their H-form or to a form whose internal pores have substantially no alkali or alkaline earth ions present therein (collectively, the "H-form"), wherein the H-form DDR framework type crystals have an $N_2$ BET surface area and a methane diffusivity; steaming the H-form DDR framework type crystals, optionally in a rotary calciner, at a temperature from 426° C. to 1100° C. for a time period from about 30 minutes to about 48 hours, so as to attain one or more of the following properties: a $CH_4$ diffusivity of no more than 95% of the $CH_4$ diffusivity of otherwise identical but unsteamed H-form DDR framework type crystals; an $N_2$ BET surface area from 85% to 110% of the $N_2$ BET surface area of otherwise identical but unsteamed H-form DDR framework type crystals; following a pre-treatment at about 100° C., an equilibrium $CO_2$ sorption capacity from 80% to 105% of the equilibrium $CO_2$ sorption capacity of otherwise identical pre-treated but unsteamed H-form DDR framework type crystals; and following a pre-treatment at about 400° C., an equilibrium $CO_2$ sorption capacity from 80% to 105% of the equilibrium $CO_2$ sorption capacity of otherwise identical pre-treated but unsteamed H-form DDR framework type crystals.

Embodiment 2

The method of embodiment 1, wherein the reaction mixture has a ratio of water to silicon oxide from about 12 to about 25 and a ratio of silicon oxide to structure directing agent of about 0.01 to about 1.0, and wherein the recovered DDR framework-type crystals have an axis ratio of 1.1 or less, the axis ratio being a ratio of a vertex-to-vertex distance and an edge-to-edge distance, a depth dimension being less than the vertex-to-vertex distance and the edge-to-edge distance.

Embodiment 3

The method of embodiment 2, wherein the axis ratio is 1.05 or less.

Embodiment 4

The method of embodiment 2 or embodiment 3, wherein less than 10 volume percent of the ZSM-58 crystals have a characteristic size of about 5 μm or less.

Embodiment 5

The method of embodiment 1, wherein the reaction mixture has a ratio of silicon oxide to alkali or alkaline earth metal of about 0.01 to about 1.0, and wherein the recovered DDR framework-type crystals have a unimodal volume versus crystal size distribution where less than 10 volume percent of the DDR framework type crystals have a characteristic size of about 5 μm or less, a crystal size for a peak in the volume versus crystal size distribution is about 15 μm to about 40 µm, and a peak height in the volume versus crystal size plot with a 1 µm bin width is at least about 10 volume percent.

Embodiment 6

The method of any one of the previous embodiments, wherein the reaction mixture further comprises from about 0.05 wt % to about 5.0 wt % seed crystals, e.g., from about 0.05 wt % to about 1.0 wt % seed crystals, based on the total weight of the reaction mixture.

Embodiment 7

The method of any one of the previous embodiments, wherein the structure directing agent is methyltropinium chloride and the DDR framework type crystals substantially comprise ZSM-58.

Embodiment 8

The method of any one of the previous embodiments, wherein the reaction mixture is maintained at a temperature of about 120° C. to about 175° C. during formation of the DDR framework type crystals.

Embodiment 9

The method of any one of the previous embodiments, wherein a ratio of the depth dimension to the edge-to-edge distance is about 0.9 or less.

Embodiment 10

The method of any one of embodiments 5-9, wherein the reaction mixture has a ratio of water to silicon oxide of about 12 to about 25, e.g., of about 12 to about 20.

Embodiment 11

The method of any one of embodiments 5-10, wherein the unimodal volume versus crystal size distribution further comprises a volume versus crystal size distribution where the difference between crystal sizes at volumes corresponding to half of the peak height is about the crystal size for the peak or less.

Embodiment 12

The method of any one of embodiments 5-11, wherein the recovered DDR framework type crystals have an axis ratio of 1.1 or less, the axis ratio being a ratio of a vertex-to-vertex distance and an edge-to-edge distance, a depth dimension being less than the vertex-to-vertex distance and the edge-to-edge distance.

Embodiment 13

The method of any one of the previous embodiments, wherein the reaction mixture further comprises an alumina source.

Embodiment 14

The method of any one of the previous embodiments, wherein the reaction mixture has a $SiO_2:Al_2O_3$ ratio of at least 3000 (e.g., at least about 4000, at least about 5000, at least about 7500, or at least about 10000).

Embodiment 15

The method of any one of the previous embodiments, wherein the steaming is done in a rotary calciner at a temperature from about 900° C. to about 1100° C. (e.g., from about 950° C. to about 1100° C., from about 975° C. to about 1100° C., or from about 1000° C. to about 1100° C.) in an atmosphere comprising from about 35 vol % to about 65 vol % steam to attain a methane diffusivity of at most 6.0E-13 $m^2/s$, e.g., at most 5.5E-13 $m^2/s$ or at most 5.0E-13 $m^2/s$.

EXAMPLES

Comparative Example A (From U.S. Pat. No. 4,698,217)

Several working examples in U.S. Pat. No. 4,698,217 are provided to describe the synthesis of ZSM-58. Table B shows the reaction conditions based on the Examples in this prior art publication. These synthesis conditions were tested for comparison with the improved crystal synthesis conditions provided herein. Table B describes synthesis mixtures that include methyltropinium iodide as the structure directing agent (SDA). Sources of (oxides of) aluminum were included in the reaction mixtures, but seed crystals were not. The $H_2O:SiO_2$ ratios of the Examples were 40. The temperatures of crystal formation for the Examples were 160° C., while the stir rates were 400 rpm. After 4 days, crystals with a relatively uniform average size of about 1 µm were produced.

TABLE B

| Comparative Synthesis Mixture | |
|---|---|
| Reactants | Comparative Ex. A |
| $SiO_2:Al_2O_3$ ratio (molar) | 60-300 |
| $H_2O:SiO_2$ ratio (molar) | 40 |
| $OH^-:SiO_2$ ratio (molar) | 0.3-0.4 |
| $Na:SiO_2$ ratio (molar) | 0.3-0.4 |
| $SDA:SiO_2$ ratio (molar) | 0.25 |
| wt % seeds (grams of seeds/wt % slurry) | 0 |
| Average crystal size, µm (SEM) | ~1 |

Comparative Examples B-H

Several additional working examples can be found in co-pending U.S. application Ser. No. 14/074,881, filed Nov. 8, 2013, as Examples 1-7 therein. Table C shows the reaction conditions based on the Examples in this prior art publication. These synthesis conditions were tested for comparison with the improved crystal synthesis conditions provided herein. Table C describes synthesis mixtures that include methyltropinium iodide (Exs. 1-4) or methyltropinium chloride (Exs. 5-7) as the structure directing agent (SDA). None of these reaction mixtures included sources of (oxides of) aluminum, but seed crystals were included in varying amounts shown below. The $H_2O:SiO_2$ ratios of the Examples were either ~47 or ~12-19. The temperatures of crystal formation for the Examples were ~160° C. for Exs. 1 and 5-6 and ~160° C. for Exs. 2-4 and 7. Crystals with a relatively uniform average size of about 10-25 µm were produced.

TABLE C

More Comparative Synthesis Mixtures

| Reactants | Ex. 1 | Ex. 2 | Ex. 3 | Ex. 4 | Ex. 5 | Ex. 6 | Ex. 7 |
|---|---|---|---|---|---|---|---|
| $H_2O:SiO_2$ ratio (molar) | ~47 | ~47 | ~19 | ~12 | ~47 | ~19 | ~19 |
| $OH:SiO_2$ ratio (molar) | ~0.11 | ~0.11 | ~0.11 | ~0.11 | ~0.11 | ~0.11 | ~0.11 |
| $Na:SiO_2$ ratio (molar) | ~0.11 | ~0.11 | ~0.11 | ~0.11 | ~0.11 | ~0.11 | ~0.11 |
| $SDA:SiO_2$ ratio (molar) | ~0.25 | ~0.25 | ~0.21 | ~0.21 | ~0.25 | ~0.13 | ~0.13 |
| wt % seeds (grams of seeds/wt % slurry) | ~0.1% | ~0.1% | ~0.3% | ~0.4% | ~0.1% | ~0.2% | ~0.2% |
| Peak crystal size, μm (Horiba light scattering) | ~20 | ~26 | ~20 | ~17 | — | — | — |
| General morph. (SEM) | Hexag. | Hexag. | Round. | Round. | Hexag. | Round. | Round. |
| Axis ratio | ~1.2 | ~1.2 | ~1.0 | ~1.0 | ~1.2 | ~1.0 | ~1.1 |

Examples 1-29

A tube furnace steamer was lined out at temperatures as described in Table D below in the presence of air saturated with ~0.8 ml/min water. To the steaming tube, sample crucibles each holding ~1-40 grams of ZSM-58 crystals were inserted. Samples were acquired at various times as outlined in Table D. Multiple forms of the ZSM-58 crystal were evaluated.

Parent (comparative) samples described in Examples 1, 12, 18, 20, and 22 were proton forms of an all-silica ZSM-58 crystal (designated H—[Si]ZSM-58 or simply H-ZSM-58 herein) and were prepared as outlined in co-pending U.S. application Ser. No. 14/074,881, filed Nov. 8, 2013. The parent (comparative) sample described in Example 24 was a proton form of ZSM-58 containing framework aluminum (designated H—[Al]ZSM-58 herein). Steaming any of these six parent samples appeared to result in slowing the methane diffusivity. Without being bound by theory, this was believed to be attributed to the steam annealing slight fissures and/or defects in the zeolite framework, e.g., by annealing silanol groups. The results of steam post-treatment are shown in Table D.

It is noteworthy that, for the samples of Examples 8-11, the $CH_4$ diffusivity could not be interpreted. Although the reason for this may not be certain, it was attributed to the severity of the steaming, which is believed to have distorted the crystal enough so as not allow the ZLC theory, as described herein, to calculate an exact/accurate diffusivity.

Examples 24-27 describe the steaming of ZSM-58 crystals containing framework aluminum. In Example 25, the relatively mild steaming conditions appeared to result in a diffusivity increase—without being bound by theory, it was believed that even the relatively mild steaming conditions appeared to cause the Al in the framework to become mobile, opening defects and attaining the undesired result of increasing the $CH_4$ diffusivity. Again, without being bound by theory, it is believed that such defects were then annealed at the more severe conditions of longer steaming time, thereby decreasing the $CH_4$ diffusivity, if only mildly.

Examples 28 and 29 evaluated the steaming of a crystal which had been calcined but not ion exchanged, where autochthonous Na cations were still present in the pores of the zeolite (designated Na—[Si]ZSM-58 or simply Na-ZSM-58 herein). As shown in Examples 28 and 29, steaming a sodium form of the crystal even at relatively low temperature (~436° C.) appeared to have a deleterious effect on the methane diffusivity. In addition, steaming the Na-containing crystal appeared to compromise the crystal integrity, as shown by the loss in surface area measured via $N_2$ BET adsorption. Again, without being bound by theory, this was attributed to the steam solvating the Na ions, which then were free to form NaOH, which is known to dissolve silicates. Following the logic, this dissolution is believed to have decreased the surface area by partially dissolving the crystal and/or by increasing fissures in the crystal to allow for faster diffusion/diffusivity.

In addition to the methane diffusivity, a surface area analysis was done using $N_2$ BET methods, and equilibrium $CO_2$ (adsorption) capacity experiments were done. Both analyses are standard techniques using standard protocols. For the $CO_2$ capacity experiments, steamed crystals were subject to two different pretreatment temperatures (~100° C. and ~400° C.), prior to the capacity analyses. The results of these analyses are show in Table D below. Although the methane diffusivities for the samples show in Table D tend to decrease with steaming, it is noteworthy that neither the $N_2$ BET surface area nor the equilibrium $CO_2$ sorption capacities were significantly detrimentally affected for most samples. This appeared to indicate that the lack of a significant deleterious impact from steaming post-treatment on the zeolite framework.

The exceptions to that trend were Examples 11 and 28. Example 11 was a sample steamed at ~1100° C. for about 24 hours, which are considered to be highly severe conditions, so it was not a surprise that there was a loss of surface area as a result of such severe treatment. The impact of steaming on a Na-form crystal, Example 28, was discussed above.

TABLE D

Properties of Examples 1-29

| Example | steaming temp, ° C. | steaming time, hrs | $CH_4$ Diffusivity, $m^2$/sec | BET-Total, $m^2$/g | $CO_2$ capacity, 100° C. pretreat, mmol/g | $CO_2$ capacity, 400° C. pretreat, mmol/g |
|---|---|---|---|---|---|---|
| 1 | H-ZSM-58 | 0 | ~9.8E-13 | ~453 | ~1.57 | ~1.50 |
| 2 | 900 | ~3 | ~5.60E-13 | ~477 | ~1.47 | ~1.34 |
| 3 | 900 | ~12 | ~4.60E-13 | ~445 | ~1.48 | ~1.44 |
| 4 | 900 | ~24 | ~3.30E-13 | ~456 | ~1.46 | ~1.40 |
| 5 | 1000 | ~3 | ~2.30E-13 | ~465 | ~1.42 | |

TABLE D-continued

Properties of Examples 1-29

| Example | steaming temp, °C. | steaming time, hrs | $CH_4$ Diffusivity, $m^2$/sec | BET-Total, $m^2$/g | $CO_2$ capacity, 100° C. pretreat, mmol/g | $CO_2$ capacity, 400° C. pretreat, mmol/g |
|---|---|---|---|---|---|---|
| 6 | 1000 | ~12 | ~1.14E−13 | ~446 | ~1.36 | ~1.39 |
| 7 | 1000 | ~24 | ~1.01E−13 | ~427 | ~1.29 | ~1.35 |
| 8 | 1000 | ~12 | N/A | ~411 | | |
| 9 | 1100 | ~3 | N/A | ~434 | ~1.40 | ~1.37 |
| 10 | 1100 | ~12 | N/A | ~1.27 | ~1.25 | |
| 11 | 1100 | ~24 | N/A | ~294 | N/A | N/A |
| 12 | H-ZSM-58 | 0 | ~1.05E−12 | ~453 | | |
| 13 | 540 | ~12 | ~8.5E−13 | ~476 | | |
| 14 | 540 | ~24 | ~6.7E−13 | ~442 | | |
| 15 | 600 | ~3 | ~7.2E−13 | ~465 | | |
| 16 | 600 | ~12 | ~6.60E−13 | ~435 | | |
| 17 | 600 | ~24 | ~4.99E−13 | ~471 | | |
| 18 | H-ZSM-58 | 0 | ~8.1E−13 | ~436 | ~1.54 | ~1.49 |
| 19 | 850 | ~12 | ~4.80E−13 | ~438 | ~1.42 | ~1.40 |
| 20 | H-ZSM-58 | 0 | ~1E−12 | ~429 | ~1.39 | ~1.37 |
| 21 | 850 | ~12 | ~3.40E−13 | ~430 | ~1.38 | ~1.38 |
| 22 | H-ZSM-58 | 0 | ~9E−13 | ~443 | ~1.5 | ~1.6 |
| 23 | 850 | ~12 | ~3.90E−13 | ~448 | | |
| 24 | H-[Al]ZSM-58 | 0 | ~9.7E−13 | ~394 | ~1.79 | ~1.78 |
| 25 | 600 | ~3 | ~1.40E−12 | ~420 | ~1.48 | ~1.47 |
| 26 | 600 | ~12 | ~7.80E−13 | ~425 | ~1.54 | ~1.50 |
| 27 | 600 Na-ZSM-58 | ~24 | ~7.80E−13 | ~418 | ~1.48 | ~1.43 |
| 28 | 426 | ~2 | N/A | ~304 | N/A | N/A |
| 29 | 540 | ~1 | N/A | ~450 | N/A | N/A |

Example 30

ZLC Experiment

About 30 mg of a ZSM-58 sample and about 50 mg of Quartz were loaded into the sample cell and reference cell, respectively. The sample was outgassed for ~2 hours at ~200° C. in a flow of ~100% helium at a flow rate of ~10 ml/min to remove physisorbed water from the sample. Subsequently, the sample was exposed to a flow of ~10% methane in helium at ~10 ml/min for ~1-2 hours at ~30° C. During this period the sorbate methane was adsorbed by the ZSM-58 sample. The total pressure in the sample line was stabilized at ~1.7 barg (~10 psig), and the pressure difference between the sample and reference line was reduced to about 1 mbar.

Figure 2:
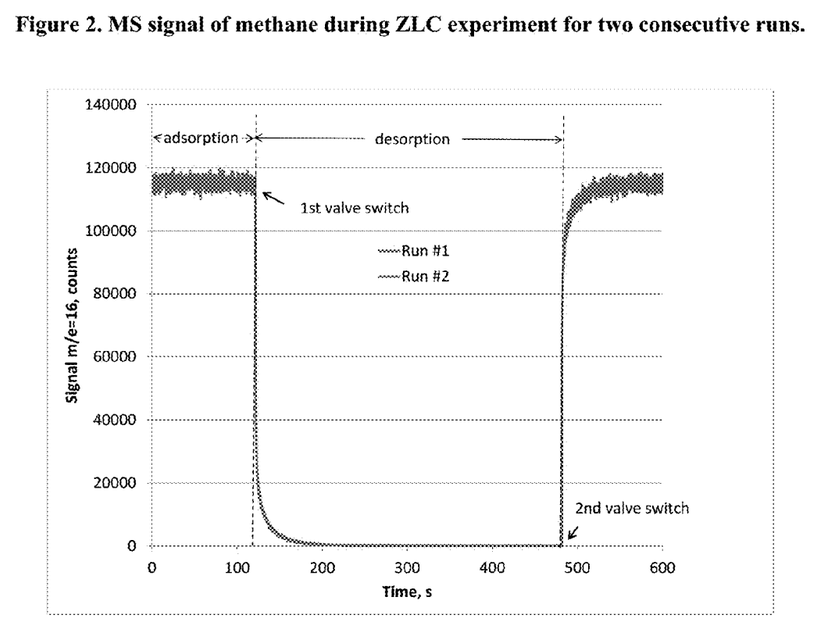
FIG. 2 shows a mass spectrometer (MS) signal for methane during the ZLC experiment conducted during Example 30.

The methane concentration during the ZLC experiment was detected by MS, and the methane signal (m/e≈16) is shown in FIG. 2, denoted as run1 and run2, for a typical ZLC experiment using a ZSM-58 sample. The signal recording started during the loading step about 2 minutes before the gas switch. The constant methane signal seen over the last ~2 minutes of the loading period appeared to indicate that stable conditions were achieved and that the methane partial pressure was equilibrated. Upon switching to helium flow in the sample line, the methane was purged from the sample line and the sample cell resulting in a decline in methane signal detected by the MS. The methane signal reached the baseline in about 5 minutes after the first valve switch. About 6 minutes after the first valve switch, the valve was switched back to position 1 in order to re-adsorb methane onto the sample. After the adsorption was completed, the methane signal appeared to return to its original intensity. The experiment described above was repeated in order to evaluate the reversibility of the adsorption/desorption process. The two consecutive runs are depicted in FIG. 2.

Evaluation

Figure 3:
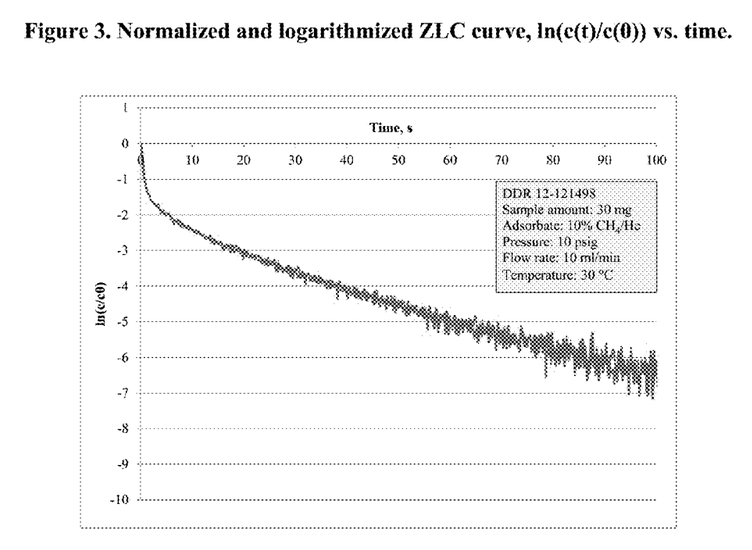
FIG. 3 shows a plot of $\ln(c(t)/c(0))$ versus time for the ZLC experiment conducted during Example 30.

For the data evaluation, the background methane signal was first determined and subtracted from the entire trace. The methane background was defined as the average MS signal between ~280 seconds and ~340 seconds after the first valve switch when the methane had fully desorbed from the sample. The initial signal, c(0), before the valve switch was determined from the average of the methane signal ~60 seconds before the first valve switch and after subtraction of the background. The time axis was subsequently redefined by setting the experimental time at the first valve switch to time zero. The signal, c(t), was subsequently normalized by the initial signal intensity, c(0). The ratio c(t)/c(0) was logarithmized and plotted as a function of time as shown in FIG. 3.

The data were evaluated using the theory described by D. Ruthven in Zeolites, 1988, 8, 40-45.

Equation 1 describes the relationship between c(t)/c(0) as a function of parameters L, β, D and R:

$$\ln\left(\frac{c(t)}{c0}\right) = \ln\left(2L\sum_{n=1}^{\infty}\frac{\exp(-\beta_n^2 Dt/R^2)}{[\beta_n^2 + L(L-1)]}\right) \quad (1)$$

where c(t) represents the concentration of the sorbate at time t; c(0) represents the initial concentration of the sorbent (before the 1st valve switch); D represents the sorbate diffusivity; R represents the crystal radius; and parameter L is defined in equation 2 below:

$$L = \frac{FR^2}{3KVD} \quad (2)$$

where F represents the flow rate of the sorbate gas; K represents Henry's constant; V represents the sample volume; and D and R are the same as in equation 1.

The values for L, D, K, and β were obtained from a least square fit of the experimental curve in FIG. 3 using equation 1, with V and R being input parameters.

Example 31

Rotary Calciner Experiments

In this Example, parent ZSM-58 crystals (sample 31A) were made similarly to those described in Examples 1, 12, 18, 20, and 22, which were prepared as outlined in co-pending U.S. application Ser. No. 14/074,881, filed Nov. 8, 2013. These crystals were calcined in a nitrogen atmosphere at ~900° F. (~482° C.) in a rotary calciner. The rotary calciner is an alternative to a commercial thermal oxidizer to at least partially (and typically substantially completely) decompose the template/structure directing agent and to reduce VOCs in the thermal oxidizer flue gas without creating an unsafe, VOC-laden atmosphere in the rotary calciner. Any remaining organic/carbon (typically ~2-3 wt %) can be decomposed/removed in a second calcination step in the rotary calciner at ~1000° F. (~538° C.), in order to attain an extremely low carbon content (~0.1 wt % or less). This doubly-calcined version is represented by Sample 31B. Then, the calcined crystal was ion exchanged with an ~0.1N HCl solution at ~80° C. in at least two (2) consecutive exchanges utilizing a ~5/1 w/w ratio of acid solution to crystal. Thereafter, the crystals were washed/rinsed with deionized water and dried overnight (~8-16 hours) in an oven at ~250° F. (~121° C.). This exchanged-and-dried version is represented by Sample 31C.

Then, these crystals were steamed at temperatures of ~1000° C., ~1075° C., and ~1150° C., in an atmosphere comprising ~60 vol % steam (water vapor). Those versions of steamed crystals are represented by Samples 31D, 31E, and 31F, respectively. Other exchanged-and-dried crystals were steamed in an atmosphere of ~40 vol % steam (water vapor) at temperatures of ~900° C., ~975° C., ~1025° C., and ~1050° C., which are represented by Samples 31G, 31H, 31K, and 31L, respectively. Other exchanged-and-dried crystals were steamed in an atmosphere of ~37 vol % steam (water vapor) at a temperature of ~1000° C., which is represented by Sample 31J.

Tables E-F show the detailed properties measured for Samples 31A-L. Samples 31J and 31L appeared to show the most promise for $CH_4/CO_2$ separation, due to their relatively low methane diffusivity, as measured by ZLC, and due to the fact that their relative $CO_2$ capacities simultaneously do not exhibit too substantial a decrease.

TABLES E-F

Properties of Example 31 Samples

| Sample | steaming temp, ° C. | vol % steam in atmosph. | BET by ZSA/MSA, $m^2/g$ | $CO_2$ capacity, 100° C. pretreat, mmol/g | $CO_2$ capacity, 400° C. pretreat, mmol/g | ZLC-$CH_4$ Diffusivity, $m^2/sec$ |
|---|---|---|---|---|---|---|
| 31A | N/A | — | | | | |
| 31B | N/A | — | | 1.72 | ~1.75 | |
| 31C | N/A | — | ~430/~19 | | ~1.57 | ~1.5E−12 |
| 31D | ~1000 | ~60 | ~360/~8 | ~1.28 | ~1.29 | |
| 31E | ~1075 | ~60 | ~370/~6 | ~1.3 | ~1.29 | |
| 31F | ~1150 | ~60 | ~200/~8 | ~0.62 | ~0.62 | |
| 31G | ~900 | ~40 | ~430/~20 | ~1.51 | ~1.48 | ~9.0E−13 |
| 31H | ~975 | ~40 | ~430/~15 | | | |
| 31J | ~1000 | ~37 | ~420/~16 | ~1.41 | ~1.44 | ~4.2E−13 |
| 31K | ~1025 | ~40 | | ~1.43 | ~1.41 | |
| 31L | ~1050 | ~40 | ~440/~16 | ~1.47 | ~1.44 | <~5.0E−13 |

| Sample | steaming temp, ° C. | vol % steam in atmosph. | Horiba Dp10 (particle size), microns | Horiba Dp50 (particle size), microns | Horiba Dp90 (particle size), microns | Micropore volume, cc/g |
|---|---|---|---|---|---|---|
| 31A | N/A | — | ~11.4 | ~24.0 | ~36.7 | |
| 31B | N/A | — | ~10.2 | ~24.5 | ~33.6 | |
| 31C | N/A | — | ~9.3 | ~23.9 | ~33.9 | ~0.17 |
| 31D | ~1000 | ~60 | ~9.7 | ~28.2 | ~43.4 | ~0.14 |
| 31E | ~1075 | ~60 | ~9.9 | ~28.0 | ~49.8 | ~0.15 |
| 31F | ~1150 | ~60 | ~13.8 | ~36.4 | ~128 | ~0.08 |
| 31G | ~900 | ~40 | ~9.5 | ~29.4 | ~39.1 | ~0.17 |
| 31H | ~975 | ~40 | | | | ~0.17 |
| 31J | ~1000 | ~37 | ~9.5 | ~27.5 | ~37.5 | ~0.17 |
| 31K | ~1025 | ~40 | | | | |
| 31L | ~1050 | ~40 | | | | ~0.17 |

Although the present invention has been described in terms of specific embodiments, it is not so limited. Suitable alterations/modifications for operation under specific conditions should be apparent to those skilled in the art. It is therefore intended that the following claims be interpreted as covering all such alterations/modifications as fall within the true spirit/scope of the invention.

What is claimed is:

1. A method for synthesizing a DDR framework type zeolite, comprising:
   forming a reaction mixture capable of forming crystalline DDR framework type material, the mixture comprising water, a silicon oxide, an alkali or alkaline earth hydroxide, and a methyltropinium salt structure directing agent, the mixture having a ratio of silicon oxide to hydroxide of about 0.01 to about 1.0, a ratio of silicon oxide to alkali and alkaline earth metal of about 0.01 to about 2.0, a ratio of silicon oxide to structure directing agent of about 0.01 to about 2.0, and at least about 0.05 wt % of seeds relative to the weight of the mixture;

recovering DDR framework type crystals from the reaction mixture;

converting the recovered DDR framework type crystals to their H-form, wherein the H-form DDR framework type crystals have an $N_2$ BET surface area and a methane diffusivity; and steaming the H-form DDR framework type crystals at a temperature from 426° C. to 1100° C. for a time period from about 30 minutes to about 48 hours, so as to attain one or more of the following properties:

a $CH_4$ diffusivity of no more than 95% of the $CH_4$ diffusivity of otherwise identical but unsteamed H-form DDR framework type crystals;

an $N_2$ BET surface area from 85% to 110% of the $N_2$ BET surface area of otherwise identical but unsteamed H-form DDR framework type crystals;

following a pre-treatment at about 100° C., an equilibrium $CO_2$ sorption capacity from 80% to 105% of the equilibrium $CO_2$ sorption capacity of otherwise identical pre-treated but unsteamed H-form DDR framework type crystals; and following a pre-treatment at about 400° C., an equilibrium $CO_2$ sorption capacity from 80% to 105% of the equilibrium $CO_2$ sorption capacity of otherwise identical pre-treated but unsteamed H-form DDR framework type crystals.

2. The method of claim 1, wherein the reaction mixture has a ratio of water to silicon oxide from about 12 to about 25 and a ratio of silicon oxide to structure directing agent of about 0.01 to about 1.0, and wherein the recovered DDR framework-type crystals have an axis ratio of 1.1 or less, the axis ratio being a ratio of a vertex-to-vertex distance and an edge-to-edge distance, a depth dimension being less than the vertex-to-vertex distance and the edge-to-edge distance.

3. The method of claim 2, wherein the axis ratio is 1.05 or less.

4. The method of claim 2, wherein less than 10 volume percent of the ZSM-58 crystals have a characteristic size of about 5 μm or less.

5. The method of claim 2, wherein the reaction mixture further comprises from about 0.05 wt % to about 5.0 wt % seed crystals based on the total weight of the reaction mixture.

6. The method of claim 2, wherein the structure directing agent is methyltropinium chloride and the DDR framework type crystals substantially comprise ZSM-58.

7. The method of claim 2, wherein the reaction mixture is maintained at a temperature of about 120° C. to about 175° C. during formation of the DDR framework type crystals.

8. The method of claim 2, wherein a ratio of the depth dimension to the edge-to-edge distance is about 0.9 or less.

9. The method of claim 1, wherein the reaction mixture has a ratio of silicon oxide to alkali or alkaline earth metal of about 0.01 to about 1.0, and wherein the recovered DDR framework-type crystals have a unimodal volume versus crystal size distribution where less than 10 volume percent of the DDR framework type crystals have a characteristic size of about 5 μm or less, a crystal size for a peak in the volume versus crystal size distribution is about 15 μm to about 40 μm, and a peak height in the volume versus crystal size plot with a 1 μm bin width is at least about 10 volume percent.

10. The method of claim 9, wherein the mixture comprises from about 0.05 wt % to about 1.0 wt % of seeds relative to the weight of the mixture.

11. The method of claim 9, wherein the structure directing agent is methyltropinium chloride and the DDR framework type crystals substantially comprise ZSM-58.

12. The method of claim 9, wherein the reaction mixture is maintained at a temperature of about 120° C. to about 175° C. during formation of the DDR framework type crystals.

13. The method of claim 9, wherein a ratio of the depth dimension to the edge-to-edge distance is about 0.9 or less.

14. The method of claim 9, wherein the reaction mixture has a ratio of water to silicon oxide of about 12 to about 25.

15. The method of claim 9, wherein the unimodal volume versus crystal size distribution further comprises a volume versus crystal size distribution where the difference between crystal sizes at volumes corresponding to half of the peak height is about the crystal size for the peak or less.

16. The method of claim 9, wherein the recovered DDR framework type crystals have an axis ratio of 1.1 or less, the axis ratio being a ratio of a vertex-to-vertex distance and an edge-to-edge distance, a depth dimension being less than the vertex-to-vertex distance and the edge-to-edge distance.

17. The method of claim 1, wherein the reaction mixture further comprises an alumina source.

18. The method of claim 17, wherein the reaction mixture has a $SiO_2:Al_2O_3$ ratio of at least 3000.

19. The method of claim 1, wherein the steaming is done in a rotary calciner at a temperature from 900° C. to 1100° C. in an atmosphere comprising from about 35 vol % to about 65 vol % steam to attain a methane diffusivity of at most 6.0E-13 $m^2/s$.

* * * * *